United States Patent Office.

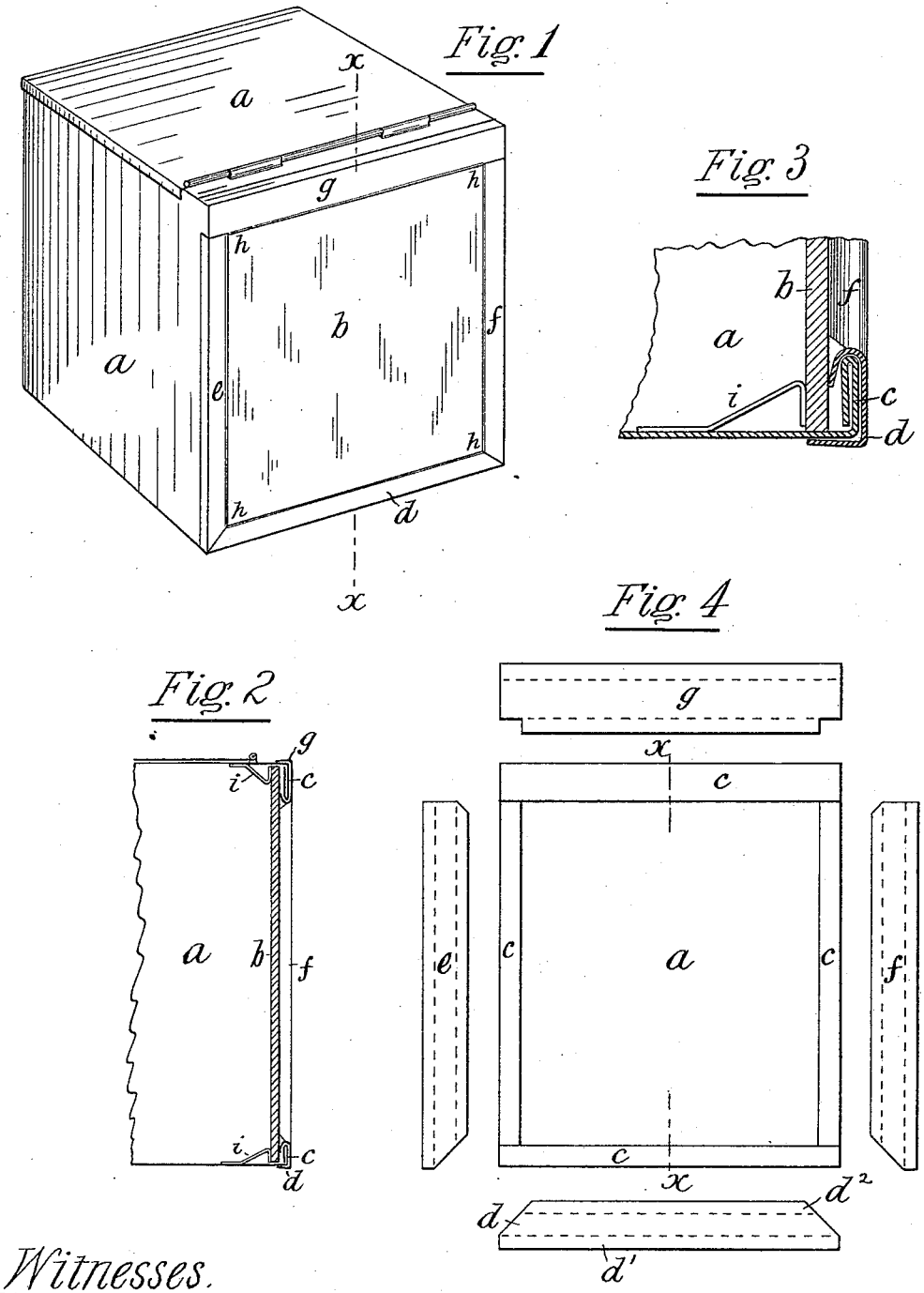

AUGUSTINE F. FITZ GERALD, OF BROOKLYN, ASSIGNOR TO THE VAN DER-VEER & HOLMES BISCUIT COMPANY, OF NEW YORK, N. Y.

BOX OR CANISTER.

SPECIFICATION forming part of Letters Patent No. 390,763, dated October 9, 1888.

Application filed March 29, 1888. Serial No. 268,727. (No model.)

*To all whom it may concern:*

Be it known that I, AUGUSTINE F. FITZ GERALD, a citizen of the United States, residing in the city of Brooklyn, county of Kings, State of New York, have invented certain new and useful Improvements in Boxes or Canisters, of which the following is a full, clear, and exact specification, reference being had to the accompanying drawings, which form a part hereof.

This invention relates to boxes or canisters for holding crackers, biscuit, and similar articles. In such boxes one of the faces or sides consists of a plate of glass and a frame or border for the same; and my invention has for its object to improve the construction of this frame or border, so as to secure, among other advantages, greater strength, durability, and cheapness, as well as a superior finish on the exhibiting side of the box.

In the accompanying drawings, to which I will now refer, Figure 1 is a perspective view of a complete box with my improvements embodied therein. Fig. 2 is a vertical central section taken on the line $x\ x$. Fig. 3 represents a portion of Fig. 2 enlarged. Fig. 4 represents an elevation of the exhibiting-face and the covering-strips.

Referring to the drawings, the box $a$ is made from thin sheets of suitable metal, preferably tinned iron, and, as shown in the drawings, is of rectangular form. The box may of course be made of any desired shape. One of the sides of this box consists of a plate of glass, $b$, held in place by a thin metal frame or border bearing against the outer side of the glass. This frame or border, as in the ordinary construction of such boxes, is composed of strips of the metal of adjacent faces bent over, so as to lie in the plane of the glass face, or is formed by soldering strips of metal to the edges of the other faces. My invention contemplates affixing covering strips to this metal frame, whereby many advantages are secured, as will be hereinafter set forth. This metal frame $c$ is shown in the drawings as composed of parts integral with the adjacent faces of the box bent at right angles, so as to lie in the plane of the glass face, and then partly folded back, so as to form a double thickness, and this frame $c$ forms the backing to which my improved covering and finishing strips are applied. These covering-strips $d$, $e$, $f$, and $g$ are made of brass or other metal adapted to receive a high polish, and are attached to the frame $c$ by bending them around the edges of the same and upon the adjacent faces of the box and soldering them, so that they will be securely held in place. They are shaped to fit the parts of the backing to which they are to be applied, as shown in Fig. 4, the dotted lines representing the lines on which they are bent or folded. These folds may be partly formed before applying the covering-strips to the box by bending one or both of the outer parts, as in the strip $d$, by bending or curving the part $d^2$ around into substantially the same shape that it ultimately assumes, and by bending the part $d'$ at right angles, or nearly so, with the main part of the strip; or the strips may be applied to the backing $c$ while flat and then bent around the edges, and the particular manner and order of application which I have found most convenient I will now describe.

The strip $d$ is first placed in position upon the lower portion of the backing $c$ and the part $d'$ bent so as to lie against the surface of the adjacent face or bottom of the box. This part $d'$ may then be soldered to the bottom of the box, or the soldering may be deferred until the other strips have been affixed to the box. The other outer part, $d^2$, is then bent and shaped so as to tightly grip the edge of the backing $c$. (See Fig. 3.) The strips $e$ and $f$ are then applied to the sides of the frame $c$ and bent and secured in place, and before permanent attachment they are moved down on the frame-pieces that they inclose, so that their lower ends lie in close contact with the inclined ends of the strip $d$. As the parts covered by the strips $d$, $e$, and $f$ are of equal width, these meeting edges are shaped to a miter or angle of forty-five degrees. If these widths were not equal, the diagonals or meeting edges would of course be at different angles. The strip $g$ is then placed in position and pressed down, so as to lie closely against the upper squared ends of the strips $e$ and $f$, and its inner side is bent around, so as to grip the edge of the backing $c$, and its outer side is bent back against the adjacent face of the box. All of the parts of the strips that lie against adjacent faces of the box are securely soldered thereto, and I have found it advisable to solder the inner portions of the strips to the backing at the corners $h\,h$. The exhibiting-face of the box when thus completed has a smooth and uniform surface, all the joints are evenly fitted, and all the inner edges are rounded, so as to give the appearance of a heavy metal frame, and a finish is imparted to it by burnishing the surface of the metal. The outer face of the plate of glass, $b$, rests against the inner edges of the strips $d\,e\,f\,g$, and the lugs $i\,i$ bear against the inner face of the same.

It is the practice in using these boxes to return them to the manufacturers many times for refilling, and when thus returned the boxes have to be recleaned and refixed, so that when again delivered to the retailer they will be substantially as good as new boxes. All the parts of the box, except the frame of the glass face, are covered with paper labels, and the old labels can be removed and new ones substituted at slight expense; but the frame of the glass face, which, according to present methods, is finished by painting or gilding, can only be renewed by repainting or regilding each time the box is returned, and it is very difficult, as well as expensive, when these operations are many times repeated, to secure an ornamental finish. By my improvement the cost of this renovation is very much reduced and far better results attained, as it is only necessary to submit the frame to the action of a burnishing-wheel, whereby a high polish is again imparted thereto.

The re-enforcement afforded to the frame by my improved covering-strips greatly adds to the strength of the same. The exhibiting face or side of such box is naturally the weakest part of the box and the first part to wear out, as on that side there is nothing but a plate of glass supported by narrow strips of metal on the sides. My re-enforcing strips strengthen this part of the box, and thus enable the box to be used for a greater length of time. Again, as these boxes are not provided with handles, persons who handle them often lift them by inserting the tips of their fingers under an inner edge of the frame, and this, in the ordinary construction causes bending and distortion of the parts of the frame, whereas with my improved construction these parts are so greatly strengthened that such usage does not affect them.

In my improved box, at the same time that I strengthen the box and make it more serviceable, I greatly improve its appearance and finish by employing at the one place where it is of value to have it an ornamental metal capable of receiving a high polish and of retaining that polish for a considerable length of time, and the covering-strips add but little to the cost of the box, as they can be cut from rectangular plates of metal with little waste, the small pieces of metal cut from the chamfered corners being the only parts rejected. Thus, with a very small additional cost at the outset, I produce a can that is much superior in every important respect and is in the end more economical, as it can be used for a longer time than a box not containing my invention.

Having now described my invention, what I claim as new, and desire to secure by Letters Patent, is—

1. A box or canister for biscuit and similar goods, having the frame of its exhibiting-face formed of a backing, $c$, of metal strips bent over from adjacent faces of the box, and covering-strips $d$, $e$, $f$, and $g$, of a metal adapted to receive a high polish, on the backing, bent around the inner edges of the backing-strips and against the adjacent faces of the box, and secured to the backing-strips and the adjacent faces of the box, substantially as shown and described.

2. In a box or canister for biscuit and similar goods, an exhibiting-face consisting of a transparent plate and a frame comprising a backing, $c$, of metal strips bent over from adjacent faces of the box, and covering-strips $d$, $e$, $f$, and $g$, of a metal adapted to receive a high polish on the backing, bent around the inner edges of the backing-strips and against the adjacent faces of the box, and secured to the backing-strips and the adjacent faces of the box, substantially as shown and described.

A. F. FITZ GERALD.

Witnesses:
 ROBERT N. KENYON,
 EDWIN SEGER.